United States Patent [19]
Pond

[11] Patent Number: 4,635,901
[45] Date of Patent: Jan. 13, 1987

[54] POSITION INDICATOR FOR VALVES

[75] Inventor: Richard J. Pond, Nailsworth, England

[73] Assignee: Smith International, Inc., Newport Beach, Calif.

[21] Appl. No.: 601,306

[22] Filed: Apr. 17, 1984

[51] Int. Cl.[4] .............................................. F16K 31/00
[52] U.S. Cl. ...................................... 251/355; 251/58; 137/554; 137/556; 91/1; 92/5 R; 116/DIG. 7; 116/285
[58] Field of Search ............... 137/553, 554, 556, 551, 137/556.3; 116/271, 272, 277, 284, 285, DIG. 7, 288; 91/1; 92/5 R, 63, 136; 251/355, 58

[56] References Cited

U.S. PATENT DOCUMENTS

| | | | |
|---|---|---|---|
| 311,833 | 2/1885 | Hoxie | 137/553 X |
| 525,561 | 9/1894 | Pedrick | 92/136 X |
| 1,855,317 | 4/1932 | Sackrider et al. | 251/355 X |
| 2,033,255 | 3/1936 | Riney et al. | 116/125 |
| 2,350,763 | 6/1944 | Jackson | 137/78 |
| 2,652,851 | 9/1953 | Schmidt et al. | 137/553 X |
| 2,930,344 | 2/1958 | Brasel | 116/125 |
| 2,959,149 | 11/1960 | Schwenk | 116/125 |
| 2,988,319 | 6/1961 | Erwin | 251/355 X |
| 3,057,205 | 10/1962 | Howard et al. | 92/63 X |
| 3,104,862 | 9/1963 | Person et al. | 251/58 |
| 3,195,418 | 7/1965 | Zukar | 251/58 |
| 3,226,081 | 12/1965 | Milleville | 251/355 |
| 3,522,596 | 8/1970 | Fowler et al. | 340/238 |
| 3,721,010 | 3/1973 | Ristow | 116/285 |
| 3,729,168 | 4/1973 | Natho et al. | 251/60 |
| 3,985,151 | 10/1976 | Smith | 251/58 |
| 4,046,350 | 9/1971 | Massey et al. | 251/58 |
| 4,133,288 | 1/1979 | Burgess | 116/227 |

FOREIGN PATENT DOCUMENTS

| | | | |
|---|---|---|---|
| 843262 | 8/1960 | United Kingdom . | |
| 850369 | 10/1960 | United Kingdom | 116/284 |
| 854819 | 11/1960 | United Kingdom | 251/58 |
| 893100 | 4/1962 | United Kingdom | 251/58 |
| 2105880 | 3/1983 | United Kingdom | 251/58 |

Primary Examiner—Samuel Scott
Assistant Examiner—H. A. Odar
Attorney, Agent, or Firm—David A. Rose; William E. Shull; David S. Wise

[57] ABSTRACT

There is disclosed herein an apparatus forming a part of an actuator for providing a constant visual display of the position of a valve. Such apparatus comprises an indicator shaft rotatably disposed in a bore which is oriented perpendicularly of and offset from an actuator stem, a rack means on the actuator stem, a pinion means on the indicator shaft, and an indicating means engraved on the end face of the indicator shaft and visible from the exterior of the actuator. The apparatus is sealingly enclosed and immersed in a fluid medium. Linear motion of the actuator stem generates angular motion of the indicator shaft, causing the indicating means to provide a visual display of valve position.

17 Claims, 5 Drawing Figures

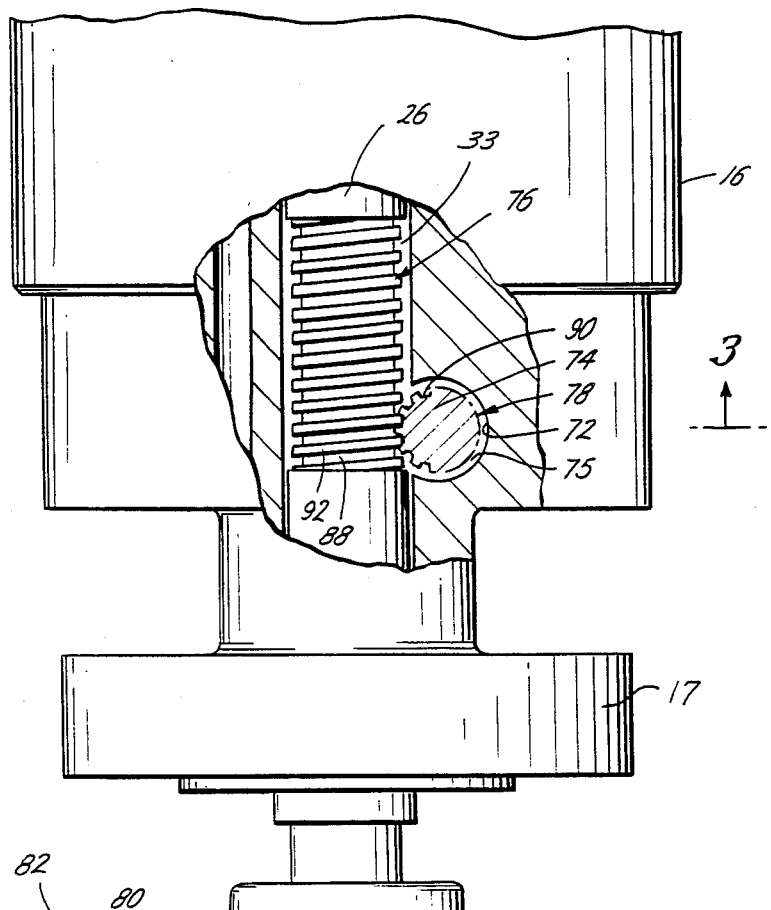
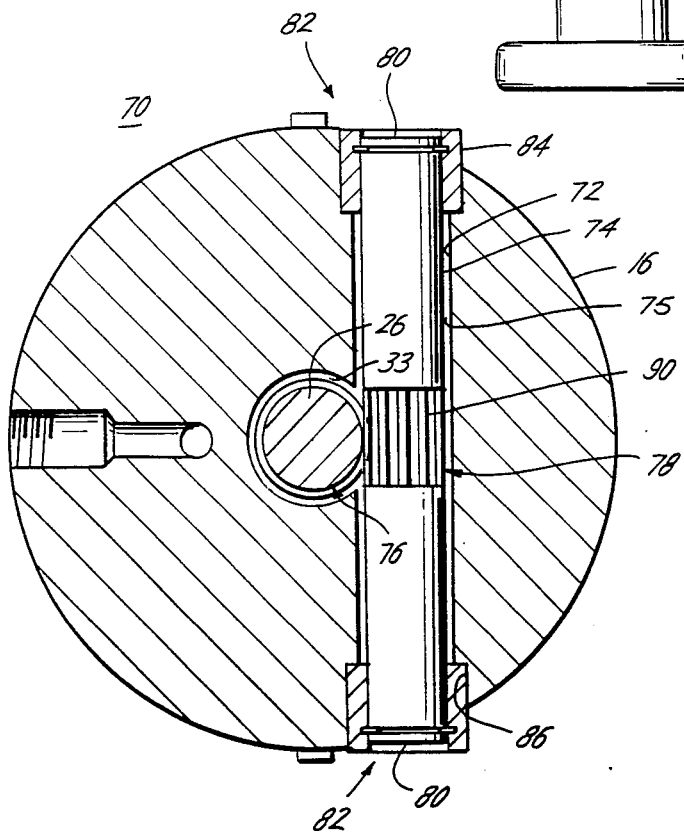

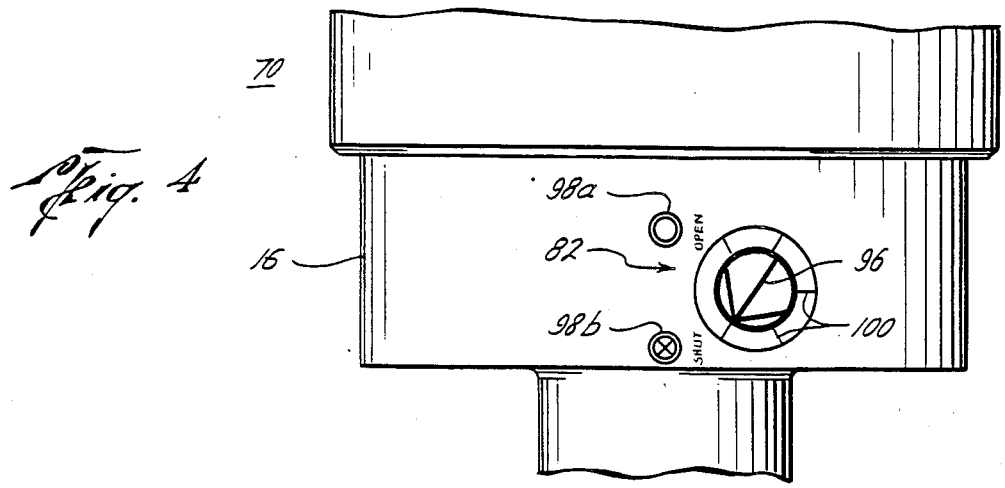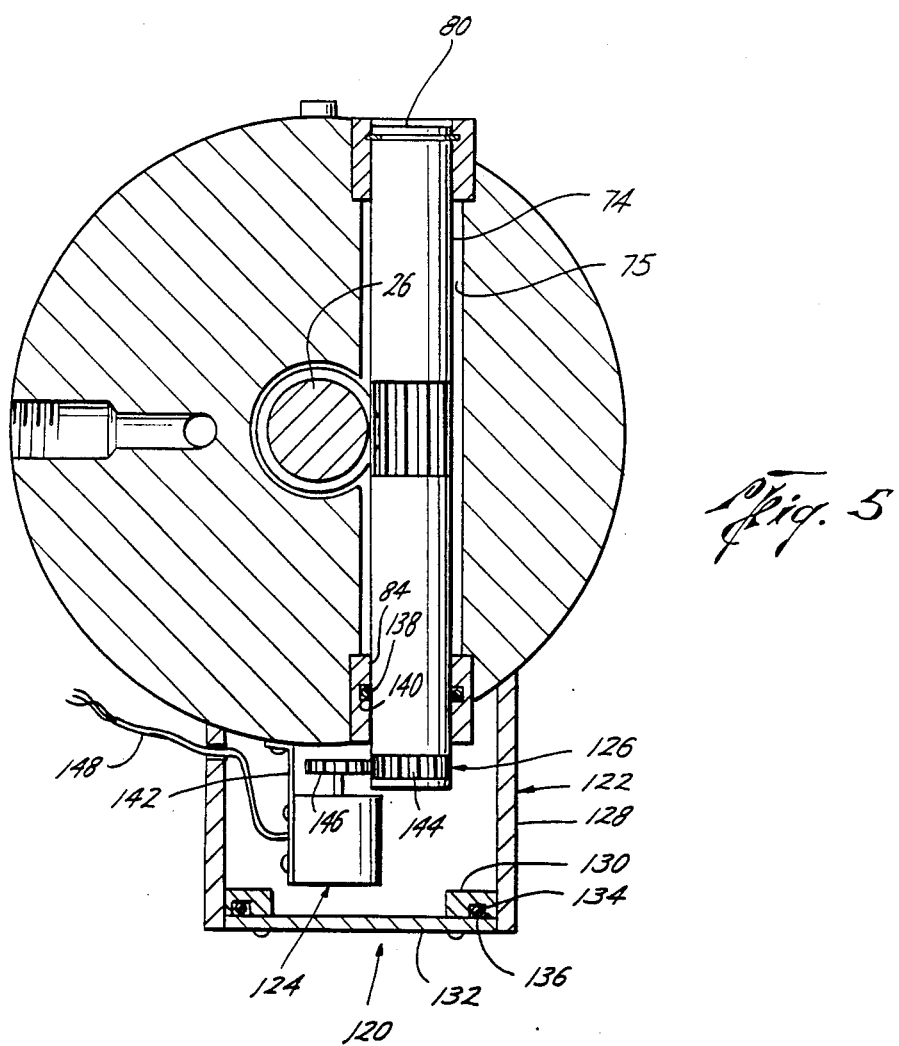

POSITION INDICATOR FOR VALVES

BACKGROUND OF THE INVENTION

The present invention relates generally to mechanisms for indicating the state of a valve used in oil and a gas production operations and, more particularly, to mechanisms for indicating the position of a reciprocating member in a reciprocating-type valve used in undersea wellheads and Christmas trees. Still more particularly, the present invention relates to a reliable apparatus for indicating the position of the reciprocating member in an undersea, hydraulically actuated, fail-safe gate valve.

Gate valves used in undersea wellheads and Christmas trees and underwater templates/manifolds for offshore oil and gas production operations often are provided with hydraulic actuators, controlled from a hydraulic power supply on a platform, to operate the valve gate. Such hydraulic actuators are frequently of the fail-safe type, in which pressurized hydraulic fluid is supplied to the actuator from the power supply through control lines or the like in order to force a piston downwardly within the actuator, and the gate along with it, thereby aligning a port in the gate with flow ports in the valve, opening the valve. If the pressure on the hydraulic fluid is removed, either intentionally or accidentally, for example, through failure of the hydraulic power supply, return springs lift the piston and gate upwardly, thereby aligning a solid portion of the gate with the flow ports of the valve, closing the valve.

Valve position indicators are useful in day-to-day operations for verifying proper functioning of the hydraulic actuator. Situations sometimes arise wherein, for any of several reasons, the valve or the actuator jams, leaving the valve open when it should be closed or closed when it should be open or somewhere therebetween. Often it is necessary to know the position of the gate in order to diagnose and correct the problem. Accordingly, a position indicator for a gate valve performs a necessary and important service.

Prior art position indicators for subsea valves tend to rely upon a detailed mechanical and/or electrical structure. See, e.g., U.S. Pat. No. 3,522,596 (Fowler et al). Fowler et al disclose the use of reed switches in connection with magnets to indicate valve position on a remote position read out device on a surface platform. The reed switches or the magnets are attached to a component which is moved in response to upward and downward motion of a valve stem. When the valve is fully open or fully closed, a corresponding reed switch is in proximity to a magnet and an electrical signal is communicated to the platform, actuating an indicator lamp or the like to inform the operator of the present valve position. (FIGS. 1-3 and 6-8). This type of apparatus can also be used to transmit information as to the rotational attitude of a rotating shaft. (FIGS. 9 and 10). Cams and microswitches, or other suitable information relay means, may be used in place of the reed switches. (FIG. 5).

In general, the more structurally detailed a device is, the more susceptible it is to operational failure. The rigors of installation and operation in an undersea oilfield environment tends rapidly to take its toll on delicate mechanical instrumentation. Electrical instrumentation, also, is susceptible to failure in the hostile undersea environment. Equipment failures must be diagnosed and the failed apparatus must be repaired or replaced, all of which is very time consuming and expensive in undersea oilfield operations. Thus, an ideal valve position indicator is simple and reliable.

SUMMARY OF THE INVENTION

Accordingly, there is provided herein an actuator including a position indicator for an undersea reciprocating-type valve. The position indicator includes a local indication means for viewing by a diver present at the undersea wellhead and, optionally, a remote indication means for providing a readout of valve position at an offshore platform on the surface of the sea.

The actuator may be, for example, a hydraulic actuator, which translates fluid pressure delivered from the surface platform into linear motion of an actuator stem for controlling the position of a gate within the gate valve. The hydraulic actuator includes a cylindrical body closed at the upper and lower ends thereof by closure members. An actuator stem is received through an axial bore in the lower closure member and extends into the hollow interior of the cylindrical body, being attached at its upper end to a piston within the body interior. A spring biasing means disposed between the piston and the lower closure member tends to maintain the actuator stem in a retracted (fail-safe) position. The lower end of the actuator stem is coupled to a reciprocating member of the valve, whereby fluid pressure delivered to the space between the upper closure member and the piston forces the piston downward, moving the reciprocating member of the valve downward and opening the valve, in the case of a fail-safe closed valve.

The valve position indicator preferably forms a part of the lower closure member and includes a cylindrical indicator bore offset from and extending generally perpendicular to the axial bore in the lower closure member, a shaft rotatably disposed in the indicator bore, a rack means forming a part of the actuator shaft, and a pinion means forming a part of the shaft. The rack means engages the pinion means whereby linear motion of the actuator stem generates angular motion of the shaft. Indicating means connected to at least one end face of the shaft may be viewed or merely touched by a diver for a reliable local display of the position of the valve.

The position indicator further includes annular seal means disposed between the actuator stem and the interior wall of the axial bore, above and below the rack means, for isolating the position indicator from hydraulic fluids and from valve fluids which might seep from the flow passages of the valve. In addition, the enclosed space around the rack means and the pinion means is provided with a fluid medium, preferably an oil lubricant.

The position indicator may comprise alternatively a remote position sensing means wherein one end of the shaft extends exteriorly of the lower closure member into a sealed sensor housing. The protruding end of the shaft includes a plurality of axially extending grooves machined in the circumference thereof, forming a gear face for rotational engagement with a sensor means. The sensor means may comprise, for example, a singleturn, rotary potentiometer having an antibacklash gear coupled to the shaft thereof for engagement with the gear face of the protruding shaft. Reciprocal motion of the actuator stem thereby induces rotation of the potentiometer shaft, permitting valve position to be encoded in the magnitude of an analog voltage. A three-conductor electric cable connects the sensor means to the surface platform.

Thus, the position indicator of the present invention acts cooperatively with an actuator to provide a mechanism for ascertaining movement of the reciprocating member within the valve. Because the position indicator does not require for its operation a detailed mechanical or electrical structure, it is relatively maintenance free. The provision of seal means disposed about the actuator seal in combination with seal means disposed about the shaft sealingly enclosing the indicator bore totally isolates the position indicator from external influence. The fluid medium filling the isolated position indicator lubricates movement of the indicator, inhibits corrosion, and inhibits the influx of corrosive and corruptive fluids in and about the rack means and the pinion means. Lubrication and anti-corrosive activity is particularly important in oilfield reciprocating-type valves where long periods of inactivity might otherwise gradually freeze the valve in a given position, perhaps defeating a fail-safe interlock.

The present position indicator is notable also for its structural connection to an actuator without adding to the actuator potential hydraulic fluid leakage paths. Because of the extreme fluid pressures involved in the hydraulic system, any sealed path of exit from the pressurized interior of the actuator must be viewed as a potential threat to the integrity of the hydraulic system and, thus, a potential weakness in the design of the actuator. The present position indicator does not contribute additional sealed ports within the hydraulic system. These and various other characteristics and advantages of the present invention will become readily apparent to those skilled in the art upon reading the following detailed description and claims and referring to the accompanying drawings.

BRIEF DESCRIPTION OF THE DRAWINGS

For an introduction to the detailed description of the preferred embodiment of the invention, reference will now be made to the accompanying drawings, wherein:

FIG. 2 depicts in side elevation and partial cross section the lower end of the hydraulic actuator of FIG. 1, showing a valve position indicator forming a portion thereof;

FIG. 3 depicts a cross-sectional view of the valve position indicator taken along a line 3—3 shown in FIG. 2;

FIG. 4 depicts the valve position indicator of FIG. 2 in side elevation alone so as to disclose the external features thereof; and FIG. 5 depicts an alternative embodiment of the apparatus shown in FIG. 3 including a remote position indicating means.

DESCRIPTION OF THE PREFERRED EMBODIMENT

Figure 1:
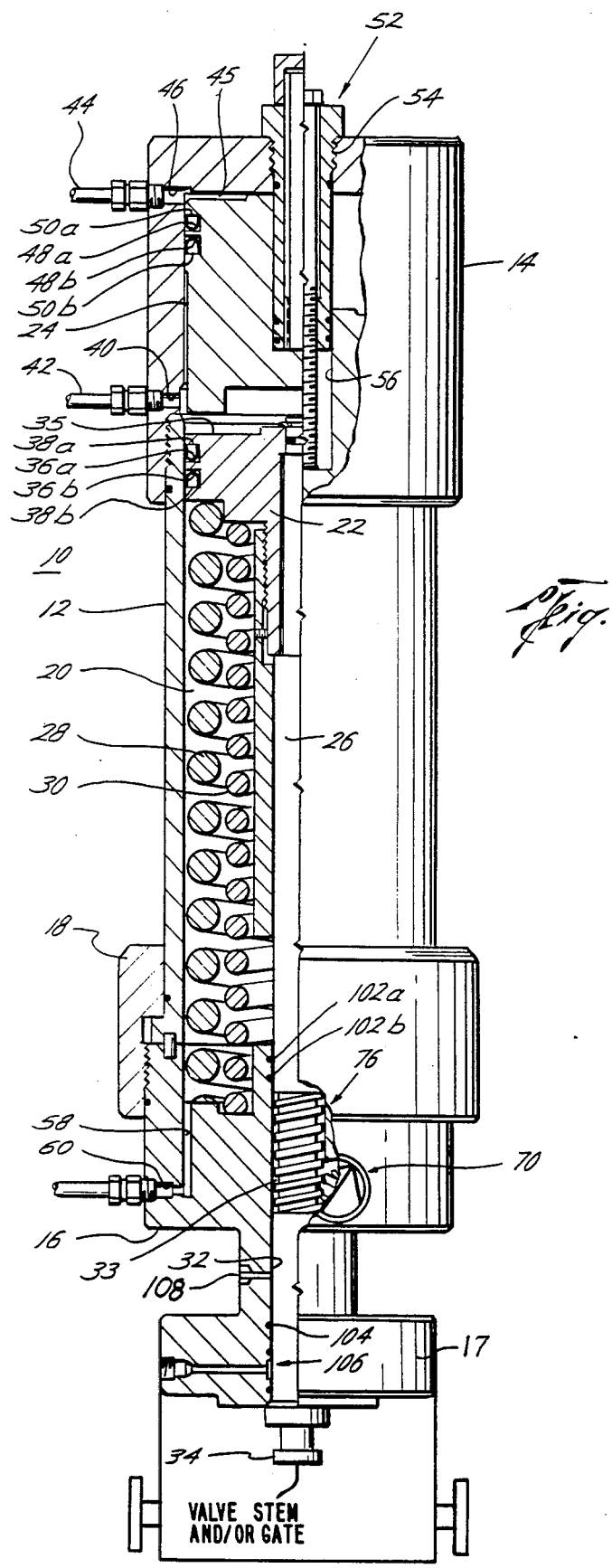
FIG. 1 depicts in side elevation and partial cross section a hydraulic actuator for an undersea gate valve, the hydraulic actuator being structured in accordance with the principles of the invention set forth herein.

Reciprocating-type valves for undersea wellheads and Christmas trees typically are actuated remotely, for example, by means of a hydraulic power supply located on an offshore platform at the surface of the sea. One or more hydraulic fluid lines connect the hydraulic power supply to a hydraulic actuator affixed to the valve on the ocean floor. The hydraulic actuator converts the energy present in the pressurized hydraulic fluid into mechanical motion of a reciprocating member within the valve to open the valve, for example, in the case of a fail-safe closed valve, which is designed to close automatically on loss of hydraulic power. Similarly, other types of actuators, such as electric or pneumatic or even manual actuators, are used to open and close reciprocating-type valves.

In spite of the substantial force which may be applied to an actuator by means of pressurized hydraulic or pneumatic fluid or electromagnetic force, a valve or the actuator therefor may occasionally jam, leaving the valve fully open or fully closed or somewhere therebetween. Absent a suitable mechanism which is independent of the control for the actuator for indicating the position of the valve, it may be impossible to ascertain whether the valve is operating properly and, if not, the extent of the failure. In the event of such a failure, information as to the present position of the valve very often is essential to the success of efforts to restore the valve to proper working condition. Hence, reliable means independent of the control for the actuator for indicating valve position at all times is a feature desirable for every reciprocating-type valve.

Referring now to FIG. 1, there is shown therein a fail-safe hydraulic actuator 10 arranged for attachment to an undersea gate valve (not shown), the actuator 10 being structured in accordance with the principles of the present invention. Although the description which follows is directed particularly to a hydraulic actuator for an undersea gate valve, it is believed that the present invention can be adapted by one skilled in the art to any of a variety of types of actuators designed for use with reciprocating-type valves. The actuator 10 comprises a generally cylindrical body member 12 received at its upper end within an upper closure member 14 and attached at its lower end to a lower closure member 16. A lower sleeve 18 encircles and sealingly encloses the juncture of the body member 12 and the lower closure member 16. The lowermost portion of the lower closure member 16 comprises a flange 17 which may be bolted to the gate valve (not shown) in alignment with the gate thereof.

The body member 12 and the upper and lower closure members 14,16 collectively define a sealed interior space 20, which encloses a pair of pistons 22,24, and actuator stem 26, and a pair of fail-safe return springs 28,30. The actuator stem 26 extends generally axially within the interior space 20 and through a generally central axial bore 32 in the lower closure member 16 to a point below the flange 17 of the lower closure member 16. The central axial bore 32 is very slightly larger in diameter than the actuator stem 26, whereby the actuator stem 26 is free to move axially relative to the closure member 16, the annular space between the wall of the bore 32 and the stem 26 being hereafter referred to as the annular stem space 33. The lowermost end of the actuator stem 26 includes an attachment means 34 for coupling to a reciprocating member which may be a valve stem (not shown), which connects to the gate within the gate valve for manipulating gate position, or directly to the gate of the valve.

The upper end of the actuator stem 26 is received within and secured to the first hydraulic piston 22. The first hydraulic piston 22 comprises a generally cylindrical element having a diameter sized to fit closely against the interior surface of the cylindrical body member 12. A pair of annular seal means 36a,b disposed within upper and lower circumferential grooves 38a,b within the first piston 22 seal the engagement of the piston 22 with the body member 12, whereby fluid pressure acting on an upper face 35 of the first piston 22 forces the piston 22 and actuator stem 26 downward, opening the valve. The upper closure member 14 includes a first generally radial bore 40 for delivering pressurized hydraulic fluid for this purpose. The pressurized fluid is delivered from the hydraulic power supply through a first fluid line (not shown), which is connected to the first radial bore 40 in the upper closure member 14 by means of a flowline fitting 42.

Referring still to FIG. 1, the first fluid line (not shown) is connected to a hydraulic power supply which is used during normal platform operations. Thus, in normal operations the first piston 22 alone is used to actuate the gate valve. Occasionally, during workover operations, a second hydraulic power supply (not shown) is used to actuate the gate valve. Thus, the second hydraulic power supply (located on the offshore platform at the surface) is connected via a second flowline (not shown) and flowline fitting 44 to the uppermost end of the upper closure member 14. Hydraulic fluid delivered through a second radial bore 46 in the upper closure member 16 acts on an upper face 46 of the second piston 24.

The second piston 24 is a generally cylindrical element having a diameter sized to fit closely against the inner sidewall surface of the upper closure member 14, with upper and lower seal means 48a,b disposed in upper and lower circumferential grooves 50a,b in the second piston for containing the pressurized fluid at the upper face 46. The second piston 24 includes an optional mechanical lockdown means 52, secured through a generally central axial bore 54 in the upper surface of the upper closure member 14 and within an axial bore 56 extending partially within the second piston 24, whereby the second piston 24 may be locked down in the actuated position.

In order to effect the fail-safe nature of the actuator 10, the outer and inner return springs 28,30 are disposed about the actuator stem 26 between the lower face of the first piston 22 and the upper face of the lower closure member 16. Thus, the pistons 22,24 are biased to the upper (safe) position which may correspond to either an open or a closed valve position, depending on the location of a flow port within the gate of the attached gate valve (not shown). The outer and inner return springs 28, 30 insure that the valve will return automatically to the safe position on failure (or intentional deactivation) of the hydraulic power supply.

As shown on FIG. 1, the lower closure member 16 includes a generally axially extending bore 58, near the outer periphery thereof, intersecting perpendicularly a radially extending bore 60, for conducting fluid disposed in the interior space 20 below the pistons 22,24 out of and back into the interior space 20 on activation and deactivation, respectively, of the actuator 10.

In accordance with the principles of the present invention, the lower closure member 16 of the hydraulic actuator 10 includes a means 70 for determining the position of the gate valve (not shown). Referring now collectively to FIGS. 2, 3, and 4 wherein the position determining means 70 is disclosed in cross section and side elevation, the position determining means 70 comprises an indicator bore 72 extending through the lower closure member 16, an indicator shaft 74 rotatably disposed in the indicator bore 72, a rack means 76 forming a part of the actuator stem 26, and a pinion means 78 forming a part of the indicator shaft 74. The determining means 70 may further comprise a pair of transparent shield means 80 for sealingly enclosing the indicator shaft 74 within the indicator bore 72 and a pair of indicating means 82 for providing a visual display of gate valve position.

The indicator bore 72 comprises a generally cylindrical bore extending through the lower closure member 16 generally perpendicularly of an axial line, offset from but intersecting the central axial bore 32. Although the indicator bore 72 is preferably a through-bore, determining means 70, consistent with the principles of the invention, could be constructed with an indicator bore opening to the exterior on but one side of the closure member 16. In the latter case only a single shield means 80 and indicating means 82 would be required. A through-bore is preferred, however, for ease of construction.

The indicator shaft 74 comprises a metallic, cylindrical shaft of substantially constant diameter, the indicator shaft diameter being less than the diameter of the indicator bore 72, defining therebetween an annular shaft space 75. Bushings 84, comprised, for example, of a suitable plastic material, are sealingly secured within counterbores 86 at each end of the indicator bore 74. The bushing 84 have an inner diameter slightly larger than the diameter of the indicator shaft 74, whereby the bushings 84 function as journal bearings with respect to the outermost ends of the indicator shaft 74.

The rack means 76 preferably comprises a plurality of spaced, circumferential grooves 88 formed in the periphery of the actuator stem 26 at a part thereof adjacent to the indicator shaft 72. Such grooves 88 may comprise a thread extending about the circumference of the actuator stem 26 or may comprise discrete channels machined into the stem 26. The length of the actuator stem 26 having such grooves 88 shall be at least as long as the full stroke of the actuator stem 26 from its deactivated to its activated position. The rack means 76 alternatively may comprise a plurality of grooves formed in the periphery of the actuator stem 26 or formed in an axially extending, planar surface on the actuator stem, such grooves extending only partially about the periphery of the actuator stem 26.

The pinion means 78 preferably comprises a plurality of spaced, axially extending grooves 90 formed about the periphery of the indicator shaft 74 adjacent to the actuator stem 26. The circumferential grooves 88 within the actuator stem 26 define therebetween circumferential land surfaces, or teeth 92, which are received within the axial grooves 90 in the indicator shaft 74. Thus, linear displacement of the actuator stem 26 is translated by the engaged rack means 76 and pinion means 78 to angular displacement of the indicator shaft 74. By proper selection of the diameter of the indicative shaft 74 and the pitch of the teeth 92 in the actuator stem 26 (which must be matched by the axial grooves 90 in the shaft 74), it should be possible to limit the full angular displacement of the indicator shaft 74 to less than one revolution, for example, to 270 degrees of revolution for the full stroke of the actuator stem 26.

The transparent shield means 80 preferably comprises a disk of transparent plastic material suitable for sealing attachment within the outermost ends of the bushings 84. In such a manner, the end faces 94 of the indicator shaft 74 are visible through the transparent shield means 80.

The indicating means 82 preferably comprises a pointer, such as an arrow 96, engraved on the end faces 94 of the indicator shaft 74, a pair of position markers 98a,b on the external surface of the lower closure member 16, and a plurality of subdivision marks 100 engraved, for example, on the end faces of the bushings 84. The position markers 98a,b correspond to and are preferable labeled as the "OPEN" and "SHUT" positions of the valve. The subdivision marks 100 subdivide the full stroke of the valve gate to facilitate a rapid visual assessment of the position of the valve at any point in time. The arrow 96 is arranged to rotate with actuator stem displacement and thereby to indicate relative to the position markers 98a,b and subdivision marks 100 the position of the valve.

Alternatively, in place of the transparent shielf means 80, it may be desirable to leave the ends of the indicator bore 72 open and extend the ends of the indicator shaft 74 beyond the lower closure member 16 (not shown). The indicating means 82, in such case, preferably comprises means for sensing by touch (as well as by sight) the position of the indicator shaft 74; for example, the end faces of the indicator shaft may be engraved so as to form raised, painted land surfaces in the shape of an arrow at such relief as may be sensed by touch. Absence of the shield means 80 necessitates the addition of annular shaft seals between the bushings 84 and the indicator shaft 74 to maintain fluid isolation within the annular shaft space 75.

Referring again briefly to FIG. 1, the rack means 76 is isolated from the interior space 20 within the body member 12 and from the exterior of the lower closure member 16 below the flange 17. The upper interior surface of the central axial bore 32 includes a pair of grooves supporting dual upper annular seal means 102a,b for isolating the rack means 76 from the interior space 20. The lower interior surface of the central axial bore 32, within the flange 17, includes a groove supporting a lower annular seal means 104 and further includes a plurality of grooves and radial bores for establishing and maintaining a plastic packing seal means 106. The foregoing seal means 102a,b, 104, 106 may comprise seal means which are generally known in the art.

Referring now to FIGS. 2, 3, and 4, the position determining means 70 is surrounded with a fluid medium, preferably a substantially transparent oil, for lubricating and for protecting the determining means 70. Thus, the annular shaft space 75 and the annular stem space 33 about the rack means 76, being sealed against external fluids and in fluid communication with one another, are charged with an oil medium through a radial bore 108 in the lower closure member 16. The oil medium reduces friction by lubricating the contact between the bushings 84 and the indicator shaft 74 and between the rack means 76 and the pinion means 78. The oil medium also inhibits corrosion of the parts comprising the determining means 70, thereby insuring that the determining means 70 will not contribute to a situation wherein the fail-safe return mechanism is defeated.

Referring now to FIGS. 1-4, the operation of the hydraulic actuator 10 is described as follows. With the actuator 10 in the state depicted in FIG. 1, pressurized hydraulic fluid is delivered from a hydraulic power supply on the offshore platform to the flowline fitting 42 for normal platform operations. The pressurized fluid flows through the first radial bore 40 and applies a downwardly directed force onto the upper face 35 of the first piston 22. Downward motion of the first piston 22 brings about corresponding downward motion of the actuator stem 26 and the gate within the valve (not shown). As the actuator stem 26 moves downward, the indicator shaft 74 rotates counterclockwise (as viewed in FIGS. 2 and 4) in response to the engagement of the rack means 76 and the pinion mean 78.

Continued downward motion of the first pinion 22 causes the arrow 96 of the indicating means 82 to rotate counterclockwise (as viewed in FIG. 4) from the "SHUT" position marker 98b to the "OPEN" position marker 98a. When the piston 22 has reached the downward limit of its stroke, the valve, which is a fail-safe closed valve, is fully open and the indicating means 82 provides a visual indication of such position.

Referring now to FIG. 5, there is shown therein an alternative embodiment of the position indicator including a remote position sensing means 120. The position sensing means 120 comprises a sealed sensor housing 122, a position sensor 124, and a sensor coupling means 126. The sensor housing 122 includes a generally cylindrical member 128 for attachment, such as by welding, to the side wall of the lower closure member 16, a seal support ring 130 affixed to the inner surface of the cylindrical member 128, and a circular seal plate 132 for attachment to the seal support ring 130. The outer diameter of the support ring 130 is sized to fit closely with the inner diameter of the cylindrical member 128. The support ring 130 includes an outwardly facing groove 134 in which is seated a circular seal means 136, which seals the interior of the housing 122 when the seal plate 132 is secured into place against the support ring 130.

The end of the indicator shaft 74 proximate to the sensor housing 122 protrudes beyond the lower closure member 16 into the interior of the sensor housing 122. An annular shaft seal 138 disposed within a seal groove 140 in the local bushing 84 replaces the shield means 80 to maintain fluid isolation within the annular shaft space 75. The position sensor 124, which may comprise, for example, a single-turn, rotary potentiometer 124, is secured by means of a bracket 142 from the sidewall of the lower closure member 16 within the sensor housing 122.

The sensor coupling means 126 may comprise a plurality of axially extending grooves 144 in the periphery of the portion of the indicator shaft 74 protruding into the sensor housing 122 and an antibacklash gear means 146 coupled to the shaft of the potentiometer 124 and engaging the grooves 144. Thus, rotation of the indicator shaft 74 in response to axial motion of the actuator stem 26 causes the gear means 146 and, thus, the wiper (not shown) of the potentiometer 124 to rotate. A three-conductor electric cable 148 communicates an analog voltage from the sensing means 120 to the surface platform. Such analog voltage varies in magnitude according to the angular position of the indicator shaft, thereby providing a remote indication of the position of the valve.

It is further anticipated that the rotary potentiometer 124 could be replaced with a linear displacement transducer coupled to the indicator shaft 74 by means, for example, of a rack engaging the grooves 144 on the protruding end of the indicator shaft 74.

Hence, the present invention provides a sealed, self-contained apparatus for indicating the actual position of a reciprocating-type valve at any point in time. The avoidance of a detailed structure insures relatively maintenance-free operation of the apparatus, a very desirable feature on apparatus used in undersea applications. The isolated and sealed fluid medium in which the apparatus operates lubricates the apparatus and protects the continued operability of the apparatus. While a preferred embodiment of the invention has been shown and described, modifications thereof can be made by one skilled in the art without departing from the spirit of the invention.

What is claimed is:

1. An apparatus for indicating the position of a valve having a reciprocating member arranged for reciprocal motion to open and close the valve, said apparatus comprising:

a support body including a generally cylindrical indicator bore extending through at least one side thereof along a line oriented generally perpendicular to the line of reciprocal motion of the reciprocating member;

a shaft rotatably disposed within the indicator bore;

means on said shaft forming a pinion;

means connected to the reciprocating member forming a rack, said rack means engaging said pinion means and being disposed for generally linear motion simultaneous and coextensive with motion of the reciprocating member;

means for sealingly isolating said rack means and said pinion means, said isolating means defining a sealed space isolated from fluids within and without said support body, said sealed space being charged with a fluid medium, surrounding said rack means and said pinion means, for protecting and lubricating said apparatus; and indicator means for providing an indication of valve position.

2. Apparatus according to claim 1, wherein the diameter of the indicator bore exceeds the diameter of said shaft, defining an annular shaft space therebetween; and wherein said apparatus further comprises a pair of bushings, one of said pair disposed at each end of the indicator bore for rotatably supporting said shaft along the axial centerline of said indicator bore.

3. Apparatus according to claim 2, wherein said support body defines a generally axial bore, coaxial with the reciprocating member, for receiving therethrough said rack means, the diameter of the axial bore exceeding the diameter of said rack means, defining therebetween an annular stem space; and wherein said isolating means comprises:

first seal means disposed in said annular stem space above said rack means;

second seal means disposed in said annular stem space below said rack means, said first and second seal means cooperatively enclosing a portion of said annular stem space to define a rack space, said rack space being in fluid communication with said annular shaft space; and means for sealingly enclosing the indicator bore.

4. Apparatus according to claim 3, wherein said pinion means comprises a plurality of axially extending grooves spaced about the periphery of said shaft.

5. Apparatus according to claim 3, wherein said rack means comprises a generally cylindrical stem means including a plurality of grooves oriented generally perpendicular to the axis of said stem means.

6. Apparatus according to claim 3, wherein said indicator means comprises a pointer on an end face of said shaft, said pointer being visible from the exterior of said support body; and wherein said apparatus further comprises a pair of position marks for defining open and closed positions of the valve, said position marks being fixed relative to said support body adjacent to said pointer and visible from the exterior of said support body, whereby said pointer relative to said position marks indicates the position of the valve.

7. An actuator for coupling to a reciprocating member arranged for reciprocal motion to open and close a valve; comprising:

an actuator stem engaged to the reciprocating member;

means for imparting axial force to said stem to cause the reciprocating member to move between the open and closed positions;

a housing enclosing said axial force means;

a lower closure member, said lower closure member defining a generally axial bore therethrough;

an indicator bore in said lower closure member, said indicator bore being open on at least one end thereof to the exterior of said lower closure member and extending generally pependicular to the axial bore, said indicator bore being offset from but intersecting the axial bore;

a shaft rotatably disposed within said indicator bore, the diameter of said indicator bore exceeding the diameter of said shaft, defining therebetween an annular shaft space;

rack means forming a part of said actuator stem;

pinion means forming a part of said shaft, said pinion means engaging said rack means;

means for sealingly isolating said rack means and said pinion means from fluids within and without said housing;

indicator means on said shaft for providing an indication of valve position; and a pair of bushings, one of said pair disposed at each end of said indicator bore for rotatably supporting said shaft along the axial centerline of said indicator bore.

8. An actuator according to claim 7, wherein said housing has a hollow interior;

wherein the diameter of said axial bore exceeds the diameter of said actuator stem, defining therebetween an annular stem space; and wherein said actuator further comprises:

first seal means disposed in said annular stem space above said rack means for sealing off said rack means from fluids within said hollow interior of said housing; and second seal means disposed in said annular stem space below said rack means for sealing off said rack means from fluids outside said actuator, said first and second seal means cooperatively enclosing a portion of said annular stem space to define a rack space, said rack space being in fluid communication with said annular shaft space.

9. An actuator according to claim 8, further comprising a fluid medium disposed in said rack space and said shaft space, said fluid medium surrounding said rack means and said pinion means.

10. An actuator according to claim 9, wherein said pinion means comprises a plurality of axially extending grooves spaced about the periphery of said shaft.

11. An actuator according to claim 10, wherein said rack means comprises a plurality of grooves in said actuator stem, said stem grooves being oriented generally perpendicularly of an axially extending line and engaging said shaft grooves, whereby linear motion of said actuator stem is translated to angular motion of said shaft.

12. An actuator according to claim 11,
wherein said indicator means comprises a pointer on an end face of said shaft, said pointer being visible from the exterior of said actuator; and
wherein said actuator further comprises a pair of position marks for denoting open and closed positions of the valve, said position marks being fixed relative to said lower closure member adjacent to said pointer and visible from the exterior of said actuator, whereby the attitude of said pointer relative to said position marks indicates the position of the valve.

13. In an actuator for coupling to a reciprocating member of a valve comprising a body member having an upper end, a lower end, a hollow interior and an exterior an upper closure member sealingly enclosing the upper end of said body member, a lower closure member sealingly enclosing the lower end of said body member, said lower closure member defining a generally axial bore therethrough, and an actuator stem extending generally coaxially within the interior of said body member and through the axial bore in said lower closure member for engagement with the reciprocating member of the valve, the improvement for indicating the position of the valve, comprising:
an indicator bore in said lower closure member, said indicator bore being open on at least one end thereof to the exterior of said lower closure member and extending generally perpendicular to the axial bore, said indicator bore being offset from but intersecting the axial bore;
a shaft rotatably disposed within said indicator bore;
a rack means forming a part of said shaft, said pinion means engaging said rack means;
means for sealingly isolating said rack means and said pinion means relative to the hollow interior of said body member and relative to the exterior of said body member; and
indicator means on said shaft for providing an indication of valve position.

14. An actuator according to claim 13, wherein a sealed space, defined by said isolating means is charged with a fluid medium, surrounding said rack means and said pinion means.

15. An actuator for indicating the position of a valve having a reciprocating member arranged for reciprocal motion to open and close the valve, said actuator comprising:
a support body including a generally cylindrical indicator bore extending through at least one side thereof along a line oriented generally perpendicular to the line of travel of the reciprocating member;
an indicator shaft rotatably disposed within the indicator bore, said indicator shaft having first and second ends;
first means on said indicator shaft forming a pinion;
means connected to the reciprocating member forming a rack, said rack means engaging said first pinion means;
means connected to said support body for sensing angular position, said sensing means comprises a potentiometer having a shaft, said potentiometer being arranged to provide an analog output signal which varies with angular position of the potentiometer shaft; and
means for coupling said sensing means to said indicator shaft.

16. Actuator according to claim 15 wherein said sensing means includes means for communicating said angular position to a remote location.

17. Actuator according to claim 16,
wherein the first end of said indicator shaft protrudes from the indicator bore; and
wherein said coupling means comprises:
second means on the first end of said indicator shaft forming a pinion; and
gear means coupled to the potentiometer shaft, said gear means engaging said second pinion means, whereby rotation of said indicator shaft generates rotation of the potentiometer shaft.

* * * * *

UNITED STATES PATENT AND TRADEMARK OFFICE
CERTIFICATE OF CORRECTION

PATENT NO. : 4,635,901
DATED : JANUARY 13, 1987
INVENTOR(S) : RICHARD JAMES POND

It is certified that error appears in the above—identified patent and that said Letters Patent is hereby corrected as shown below:

In Claim 13, column 11, line 19, after "valve" insert --, --.

In Claim 13, column 11, line 21, after "exterior" insert --, --.

In Claim 13, column 11, line 38, after "a part of said" insert -- actuator stem;

a pinion means forming a part of said --.

In Column 1, line 45, change "read" to -- reed --.

In Column 4, line 46, change "and" to -- an --.

Signed and Sealed this

Fifth Day of April, 1988

Attest:

DONALD J. QUIGG

Attesting Officer

Commissioner of Patents and Trademarks